June 11, 1963  H. R. SCHELP ETAL  3,093,348
HYPERSONIC AIRCRAFT
Filed Oct. 6, 1960  4 Sheets-Sheet 1
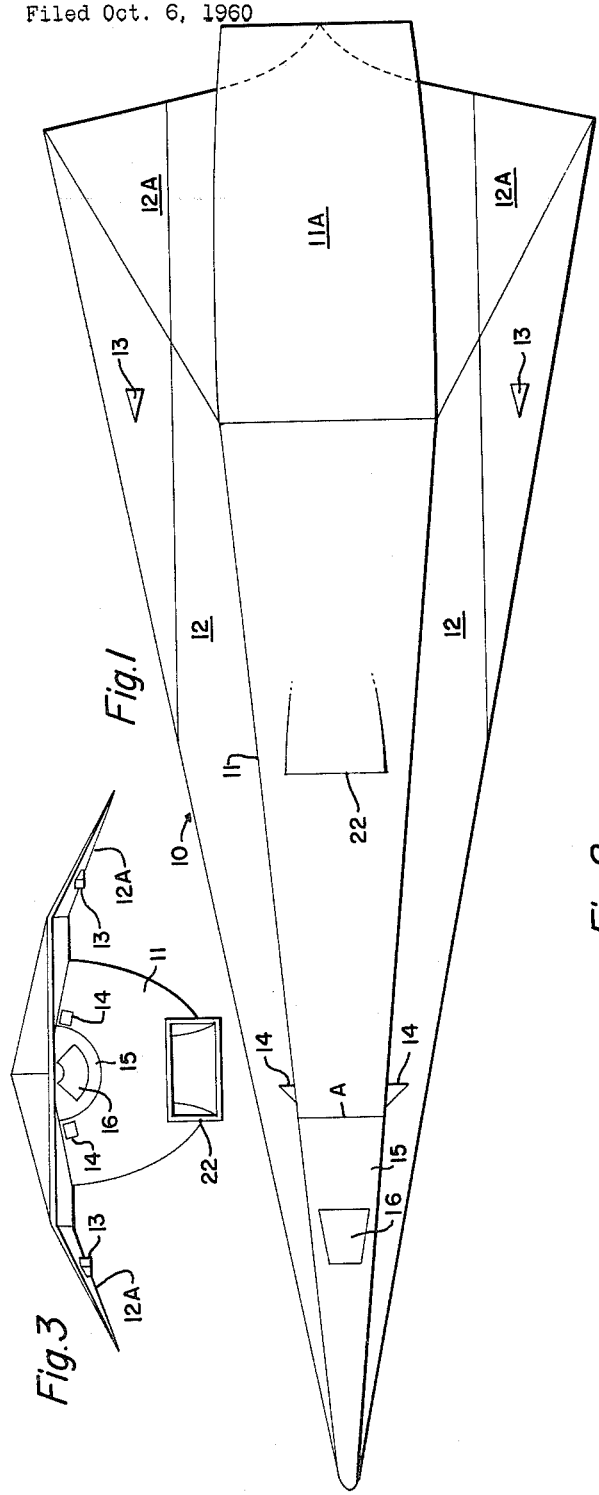
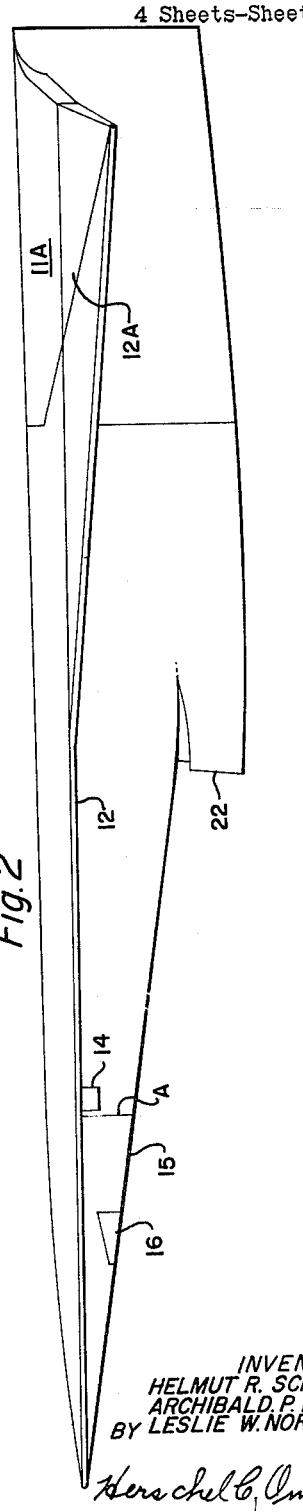
INVENTORS
HELMUT R. SCHELP
ARCHIBALD P. KELLEY
BY LESLIE W. NORMAN
Herschel C. Omohundro
ATTORNEY

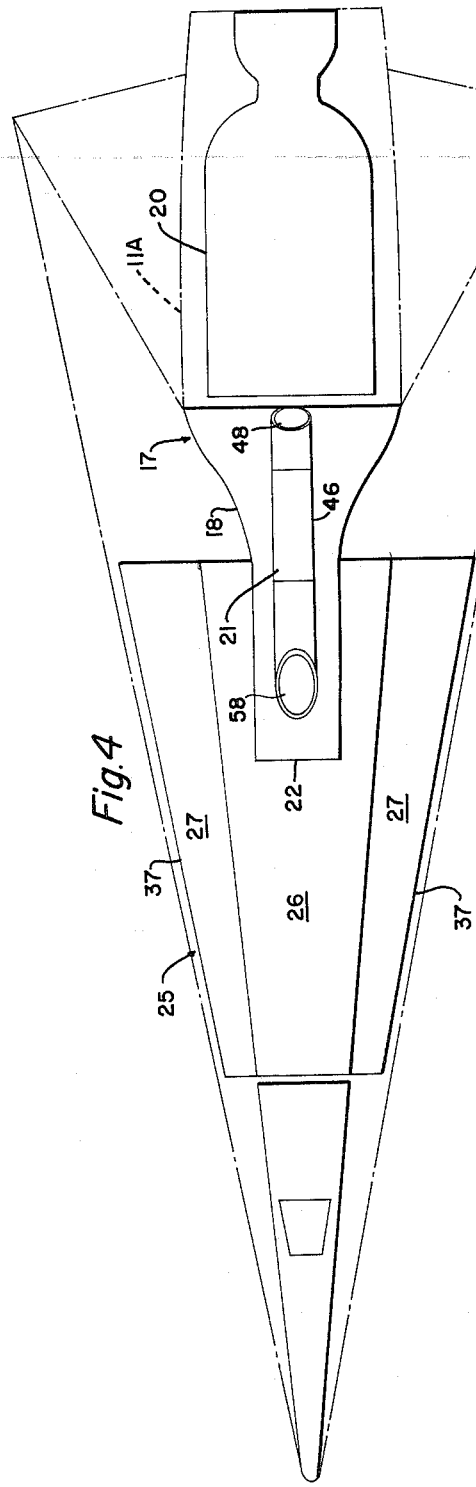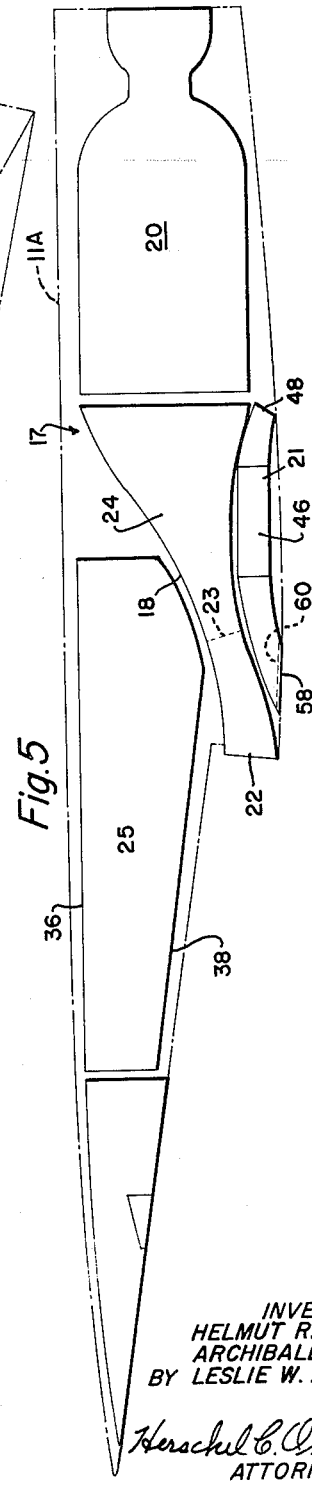

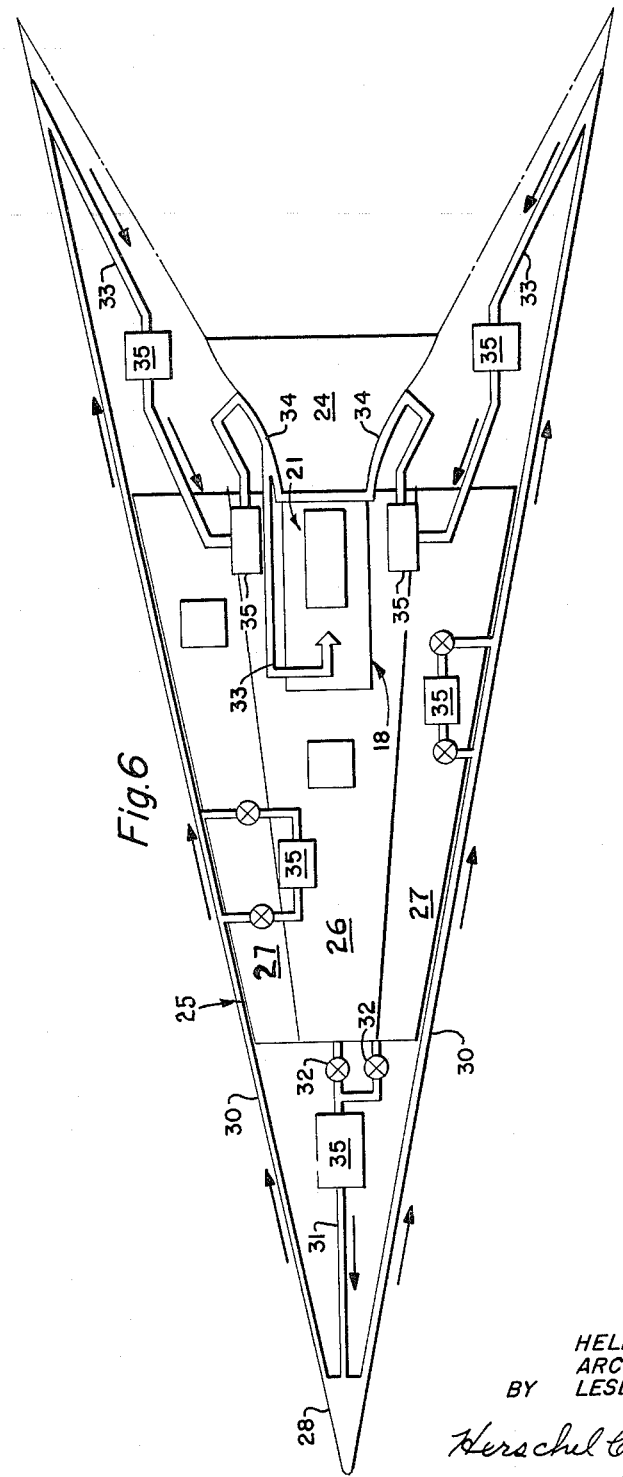

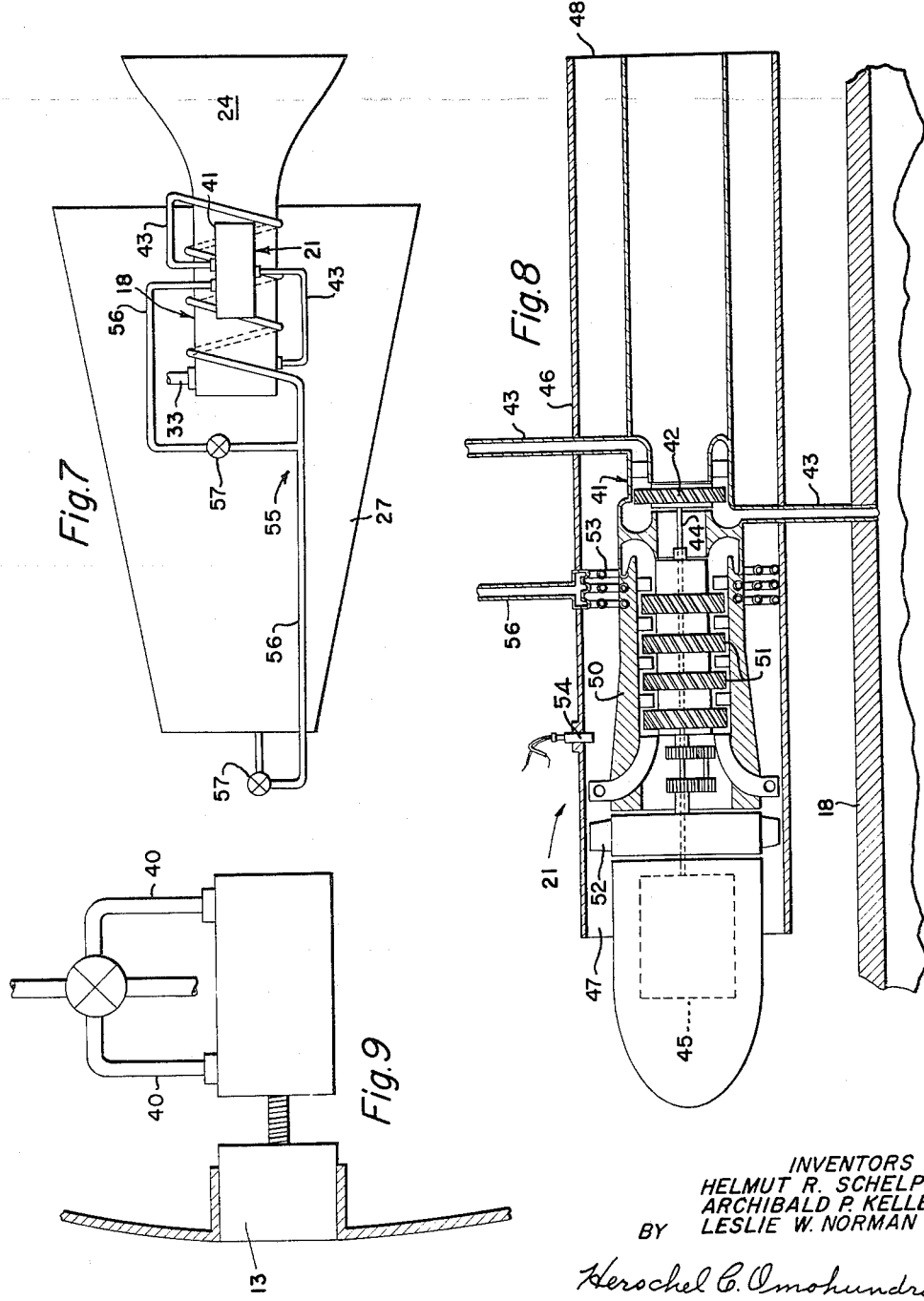

3,093,348
HYPERSONIC AIRCRAFT
Helmut R. Schelp, Archibald P. Kelley, and Leslie W. Norman, Scottsdale, Ariz., assignors to The Garrett Corporation, Los Angeles, Calif., a corporation of California
Filed Oct. 6, 1960, Ser. No. 61,025
8 Claims. (Cl. 244—15)

This invention relates generally to aircraft and is more particularly directed to a compact hypersonic vehicle particularly adaptable for use on military missions of certain types.

One object of this invention is to provide an aircraft which is capable of performing missions requiring extremely high flight and relatively low landing speeds which have heretofore been unattainable with manned aircraft.

Another object of this invention is to provide an aircraft of unique design which is particularly suitable for hypersonic, as well as subsonic, speeds, the aircraft having a unique propulsion system composed of a plurality of different engine units each of which is adapted to perform a particular phase of the desired flight mission.

Still another object of this invention is to form the aircraft propulsion system mentioned in the preceding paragraph with a ramjet engine of a particular type, a booster engine of the rocket type for launching the aircraft on the desired mission, and a third engine of a modified jet type for landing the aircraft at relatively slow speed after the mission has been completed.

A further object of this invention is to provide an aircraft capable of hypersonic speeds, the aircraft being powered by a detonation ramjet engine forming a part of the propulsion system therefor, such engine requiring movement of the aircraft at a predetermined Mach number or velocity to effect operation thereof, the aircraft having a rocket booster for launching purposes and to accelerate the vehicle to the required velocity, after which the rocket booster separates from the aircraft to permit the latter to continue on its mission.

A still further object of the invention is to provide the aircraft mentioned in the preceding paragraph with an engine unit especially for landing the craft at a relatively low speed, such engine unit being of a modified jet type in which a turbine is provided to drive a compressor, the turbine being operated by the fuel under pressure prior to combustion of the fuel, the fuel exhausted from the turbine being mixed with air from the compressor and burned to heat the fuel before passage thereof through the turbine and to provide a jet exhaust stream to propel the aircraft.

A further object of this invention is to provide the aircraft mentioned in the preceding paragraph with means for utilizing the fuel prior to introduction thereof to the engine as a heat sink for cooling parts of the aircraft exposed to heat resulting from high velocity flight, as well as the heat generated by combustion of fuel.

A still further object of the invention is to provide a compact hypersonic aircraft having a propulsion system with an engine using hydrogen fuel which must be supplied under high pressure, the aircraft having fuel storage means and means for utilizing the heat resulting from high velocity operation of the aircraft to maintain the fuel in the storage means at the required high pressure.

Another object of the invention is to provide the compact hypersonic aircraft mentioned in the preceding paragraph with power conversion means responsive to the pressure of the fuel in the storage means and the flow from the storage means for actuating flight controls on the vehicle and for operating auxiliary electrical power generating means.

Other objects and advantages will be apparent from the following description of one form of the invention which has been illustrated in detail in the accompanying drawings, in which:

FIG. 1 is a plan view of the underside of an aircraft formed in accordance with the present invention;

FIG. 2 is a side elevational view of the aircraft shown in FIG. 1;

FIG. 3 is a front elevational view of the aircraft;

FIG. 4 is a plan view from the bottom of the aircraft showing in full lines the cabin portion of the fuselage, the fuel tank, and the propulsion system, the outlines of the aircraft being indicated by chain lines;

FIG. 5 is a side elevational view of the apparatus shown in FIG. 4;

FIG. 6 is a bottom plan schematic view of a part of the fuel system utilized in the aircraft forming the subject matter of the invention;

FIG. 7 is a similar view of another part of the fuel system;

FIG. 8 is a longitudinal sectional view of the portion of the propulsion system of the aircraft used for landing the same, the view also illustrating power conversion means used in the aircraft for generating electric power; and FIG. 9 is a schematic view, partly in section, showing a flight control element and means for utilizing fluid under pressure to effect operation thereof.

In carrying out the objects of the invention enumerated above, an airframe 10 has been provided. This airframe is somewhat unique in construction in that it has an arrowhead profile when viewed in plan, such shape being selected to offer as little resistance as possible to forward motion of the aircraft through the atmosphere. The airframe includes an elongated, substantially conical fuselage 11, which tapers from a pointed front end to the rear, and short cantilever wings 12 which also extend from the front end of the fuselage to the rear end of the airframe, the greatest width of the latter being at such rear end. It will be seen from FIG. 1 that the airframe 10 has a length-to-width ratio of approximately 2.5:1. It will also be seen from FIGS. 1 and 2 that the airframe is made in two separable pieces, the rear portion 11A of the fuselage and adjacent portions 12A of the wings forming one part which is separated from the main part of the aircraft after the airframe has been launched and accelerated to a predetermined speed. The outer edges of the wing portions 12A extend rearwardly from the line where the fuselage portions separate to the outermost points of the wings, thus accenting the arrowhead profile of the aircraft after the rear portion has separated therefrom.

As shown in FIGS. 2 and 3, the wings 12 slope downwardly, the outer rear end portions being sloped at a greater angle than the rest of the wings. As mentioned, the shape of the aircraft has been designed to provide for high speed on the order of from Mach 5 to Mach 6.5. The combined wing and fuselage shape serves to create shock waves when the aircraft is travelling at the designated velocities which will serve to support the aircraft in the air.

To control the direction of the craft in flight, the wings and the fuselage are provided with flight control elements 13 and 14 of wedge shape which may be projected into and retracted from the air stream. When projected, the wedges set up small shock waves which modify those set up by the wings and fuselage with the result of changing the direction of travel of the craft.

As indicated by the line A in FIGS. 1 to 5, incl., the forward end portion 15 of the fuselage may also be separated from the airframe. Portion 15 includes the pilot's cabin and instrument compartment; suitable means, such as a parachute (not shown), may be provided to retard the descent of the portion 15 after separation thereof from the airframe. It should be obvious that the portion 15 could be made up of a plurality of separable pieces, or escape hatches could be provided for the jettisoning of equipment and personnel if desired. Due to the relatively restricted height of the fuselage portion 15, it is intended that the pilot occupy a prone position in the aircraft immediately over and behind the glazed sight opening 16 provided in the underside of the fuselage.

To effect the operation of the aircraft 10, a unique propulsion system designated generally in FIGS. 4 and 5 by the numeral 17 has been provided. This system 17 includes a main flight engine 18, a launching engine 20, and a landing engine 21. From the different designations, the functions of the various propulsion system components are apparent. It has been pointed out previously that the main object is to provide an aircraft for special missions requiring high flight velocities. To attain such velocities, the main flight engine 18 is of the ramjet type in certain characteristics but is modified by an inlet 22 designed to create a series of shock waves, with inlet ram-air speeds of from Mach 5 to Mach 6.5, which will raise the temperature and pressure of a suitable fuel and air mixture sufficiently to cause it to detonate with consequent substantially instantaneous expansion. One of the features of the invention is the use of hydrogen fuel which has a heating value approximately three times the fuel now in general use in jet engines. The specific heat of hydrogen is also approximately twelve times that of fuel, such as JP4, now in general use in jet engine operation. This characteristic enhances the use of the fuel as a heat sink for purposes to be hereinafter set forth.

From FIG. 5 it will be seen that the main engine inlet 22 converges to a predetermined reduced throat 23 from which the outlet 24 diverges, forming a jet exhaust nozzle for the gases generated by the detonation of the fuel and air mixture. These gases propel the craft through the atmosphere, the energy in the gases being sufficient to drive the craft at the above-mentioned velocities. It will be obvious that to initiate the operation of the main engine, the craft must be moving through the atmosphere at a velocity sufficient to create ram air Mach numbers of from 5 to 6.5. It is therefore proposed to utilize a rocket booster as the launching engine 20.

This rocket booster or launching engine 20 is contained within the portion 11A of the fuselage, which, as previously pointed out, is separably mounted at the rear portion of the airframe. During the launching phase of the mission of the aircraft, the booster rocket occupies a position immediately behind the main engine and is secured to the airframe by suitable fastening means, such as explosive bolts or the like used in separating missile stages, which may be operated to permit the rocket booster to separate from the airframe after the desired speed has been attained. The rocket booster may be separated from the main portion of the airframe by frictional drag, or it may be blasted therefrom by suitable means. The main engine inlet is so constructed that prior to the initiation of the operation of the main engine the ram air will be deflected by an angularly disposed door or dumped overboard through a suitable door in the inlet to decrease the resistance to forward movement of the aircraft. When the required speed has been reached under the influence of the rocket booster, the ram air deflecting door will be opened or removed or the dumping means will be adjusted or closed to direct the air through the main engine throat and fuel will be added to the entering air to cause the mixture to detonate. Suitable controls such as manually operated switches, levers or speed sensors and associated automatic actuators will be provided to cause the separation of the rocket booster immediately prior to the starting of the main engine.

The system for supplying hydrogen fuel to the engine has been schematically illustrated in FIG. 6. This system includes a fuel storage reservoir 25, which, in this instance, has fuselage and wing tank sections 26 and 27, respectively, and conduits or conductors extending from the storage reservoir to the engine. One of the features of the invention is to locate the conduits so that they will be exposed to and engaged by the ram air to absorb heat generated by flight speed. As shown in FIG. 6, these portions of the conduit include a portion 28 of the forward end of the fuselage and lines 30 extending along the diverging leading edges of the wings. A line 31 extends from the reservoir to the portion of the conduit 28 at the front end of the fuselage. This line is provided with suitable valving 32 to control the flow of fuel from the different sections of the reservoir. Lines 33 also extend from the rear ends of the conduits 30 in the leading edges of the wings to heat exchange means 34 extending around the outlet portion 24 of the main engine; and, as indicated, a portion of line 33 terminates in the forward or inlet portion of engine 18 where the fuel is introduced to provide the fuel and air mixture for detonation at the region where the desired shock wave occurs. A plurality of heat exchangers 35 are indicated in FIG. 6 by diagrammatic blocks disposed at different locations on the airframe and communicate with the fuel system. The purposes of these heat exchangers will be set forth hereinafter.

It is intended in the operation of the aircraft that the hydrogen fuel will be liquefied and pressurized in the storage reservoir. The pressure will be increased immediately prior to launching the aircraft to place the hydrogen fuel in a high pressure phase. The storage reservoir has portions (top 36, side 37, and bottom wall 38) so located on the airframe that heat created by flight speeds will be absorbed by the fuel to maintain such fuel at the high pressure. This high pressure is utilized to inject the fuel through the extension of line 33 (see FIG. 6) into the air entering or being compressed in the inlet of the engine 18. It may be added to the air at suitable points along the converging engine inlet upstream of the restricted throat 23 to intimately mix with the air and produce the fuel and air mixture to be detonated when this mixture reaches the proper pressure and temperature.

The pressure of the fuel is also used for other purposes; for example, some of the fuel may be passed through expansion or power conversion devices of other types to provide power for moving the flight control elements 13 and 14. One such device has been diagrammatically illustrated in FIG. 9. This device includes a plurality of combined inlet and outlet lines 40 which may be alternately connected with the fuel system to receive fuel under pressure and discharge such fuel back into the system. The pressure of the fuel will cause the device to actuate the flight control in the desired direction; and it will be understood that one of the FIG. 9 devices is inserted in the fuel lines 30 (FIG. 6) at appropriate places adjacent each of the flight control elements 13 and 14 shown in FIG. 1. The fuel pressure will also cause fuel flow through the heat exchangers 35 to extract heat from various parts of the aircraft, one heat exchanger being employed to cool the pilot's and electronic controls compartment. Others may be employed to cool the flight control wedges, the heat in the fuel reservoir sections, and others may be used to maintain landing gear wells at safe temperatures. Suitable valves are arranged in the fuel system to regulate the flow of fuel under pressure through the heat exchangers as indicated in FIG. 6. As previously mentioned, heat exchanger means 34 are provided around parts of the main engine. By locating the heat exchangers and fuel system conduits as set forth, critical parts of the aircraft may be cooled to prevent excessive heating and possible destruction thereof due to flight speeds. The absorption of heat by the fuel will maintain the required pressures and at the same time increase the fuel temperature to improve combustion. The fuel serves as a medium for storing energy in addition to that inherently contained in the fuel. This energy is utilized to operate parts of the craft.

Another example of such use is illustrated in FIG. 8, which constitutes a longitudinal sectional view of the landing engine component 21 of the propulsion system. An auxiliary power unit 41 is also included in this assembly. The unit 41 includes an expansion turbine 42 to and from which a portion 43 of the fuel system extends. This portion of the fuel system terminates in the inlet of the main engine 18 so that fuel utilized to operate the auxiliary power unit may be added to the fuel burned by the main engine. The auxiliary power unit turbine 42 has a shaft 44 which extends to an alternator or generator 45, the operation of which provides electrical energy for the aircraft. The landing engine assembly 21 shown in FIG. 8 also includes a duct 46 which forms an air inlet 47 and a jet outlet nozzle 48 for the landing engine. The landing engine body 50 is contained within the duct 46 and is provided with a multistage turbine 51 mechanically connected to drive a compressor 52 also forming a part of the landing engine. This engine has a heat exchanger 53 located in the duct around a portion of the landing engine body. The heat exchanger communicates with the fuel system to receive hydrogen under pressure from the fuel storage means. The heat exchanger 53 exhausts to the inlet of the multistage turbine 51 and flow of unburned fuel into the inlet will cause the turbine to be operated to drive the compressor 52. Fuel exhausted from the turbine 51 is introduced into the duct 46 immediately downstream from the compressor to mix with air flowing from the compressor. This fuel-air mixture is then ignited by an ignition device 54 and burned to apply heat to the heat exchanger, this heat increasing the temperature of the fuel flowing to the turbine.

After passage through the heat exchanger, the products of combustion issue from the jet outlet of the landing engine to propel the aircraft during landing operation. It will be obvious that the pressure applied to the fuel is utilized to cause fuel flow to the landing engine, some of this pressure being extracted in the operation of the turbine.

FIG. 7 illustrates the portion 55 of the fuel system utilized to conduct fuel to the auxiliary power unit and the landing engine. Parts of the conduits forming this portion of the fuel system are coiled around the forward portion of the main engine to serve as heat exchange means to extract heat from the main engine and to utilize such heat in the operation of the auxiliary power unit. A conduit 56 forming a part of this system also conducts fuel from the fuel storage means to the landing engine. Suitable valve means 57 are provided in these conduits to control the flow of fuel therethrough.

From FIGS. 4 and 5 it will be observed that the landing engine is disposed on the aircraft immediately beneath the main engine. The landing engine could, however, be disposed at any other suitable location such as above or at the side of said main engine. The inlet end 58 of the duct 46 forming a part of the landing engine may be closed by a suitable means 60 during normal flight operations, to eliminate resistance. The closure means 60 may be opened immediately prior to the landing phase of the aircraft mission.

We claim:

1. In an aircraft, the combination comprising: an airframe; fuel storage means in said airframe for receiving and holding fuel; a main engine mounted on said airframe and having a converging inlet for receiving air and a diverging outlet; means on said airframe establishing communication between said fuel storage means and said main engine for introducing fuel into said inlet to produce an air and fuel mixture, the inlet being shaped to create a series of shock waves and thereby increase the pressure and temperature of the air and fuel mixture sufficiently to cause detonation thereof when the airframe is traveling at a velocity corresponding to a Mach number of substantially 6.5; and a rocket booster separably mounted on said airframe, said rocket booster serving to initiate motion of said airframe and accelerate the same to said velocity.

2. In an aircraft, the combination comprising: an airframe; fuel storage means in said airframe for receiving and holding fuel; a main engine mounted on said airframe and having a converging inlet for receiving air and a diverging outlet; means on said airframe establishing communication between said fuel storage means and said main engine for introducing fuel into said inlet to produce an air and fuel mixture, the inlet being shaped to create a series of shock waves and thereby increase the pressure and temperature of the air and fuel mixture sufficiently to cause detonation thereof when the airframe is traveling at a velocity corresponding to a Mach number of substantially 6.5; a rocket booster separably mounted on said airframe for initiating motion of said airframe and accelerating the same to said velocity; and a landing engine of the jet type mounted on said airframe and communicating with said fuel storage means.

3. In an aircraft, the combination comprising: an airframe of arrowhead shape when viewed in plan, said airframe having a length-to-width ratio of substantially 2.5:1; fuel storage means in said airframe for receiving and holding hydrogen fuel at high pressure; a main engine mounted on said airframe; means on said airframe establishing communication between said fuel storage means and said main engine, said engine having a converging inlet for receiving air and a diverging outlet, the inlet being shaped to increase the air and hydrogen fuel to a pressure and temperature sufficient to cause detonation thereof when the airframe is travelling at a velocity corresponding to a Mach number of substantially 6.5; and a rocket booster separably mounted on said airframe, said rocket booster serving to initiate motion of said airframe and accelerate the same to said velocity.

4. In an aircraft, the combination comprising: an airframe of arrowhead shape when viewed in plan; fuel storage means in said airframe for receiving and holding hydrogen fuel at high pressure; means on said airframe for utilizing heat caused by flight speed to maintain the fuel in said fuel storage means at high pressure; a main engine mounted on said airframe; fuel conducting means on said airframe establishing communication between said fuel storage means and said main engine to supply the latter with fuel, said engine having a converging inlet and a diverging outlet, the inlet being shaped to increase the air and hydrogen fuel to a pressure and temperature sufficient to cause detonation thereof when the airframe is travelling at a velocity corresponding to a Mach number of substantially 6.5; a rocket booster separably mounted on said airframe, said rocket booster serving to put said airframe in motion and accelerate the same to said velocity; and heat exchange means on said airframe in regions exposed to high ram-air temperatures, said heat exchange means being in communication with said fuel conducting means.

5. In an aircraft, the combination comprising: an airframe of arrowhead shape when viewed in plan; fuel storage means in said airframe for receiving and holding hydrogen fuel at high pressure; means on said airframe for utilizing heat caused by flight speed to maintain the fuel in said fuel storage means at high pressure; a main engine mounted on said airframe; fuel conducting means on said airframe establishing communication between said fuel storage means and said main engine to supply the latter with fuel, said engine having a converging inlet and a diverging outlet, the inlet being shaped to increase the air and hydrogen fuel to a pressure and temperature sufficient to cause detonation thereof when the airframe is travelling at a velocity corresponding to a Mach number of substantially 6.5; a rocket booster separably mounted on said airframe, said rocket booster serving to put said airframe in motion and accelerate the same to said velocity; and heat exchange means mounted on said airframe in regions exposed to high ram-air temperatures, said heat exchange means communicating with said fuel storage means and having hydrogen fuel circulated therethrough.

6. In an aircraft, the combination comprising: an airframe of arrowhead shape when viewed in plan; fuel storage means in said airframe for receiving and holding hydrogen fuel at high pressure; means on said airframe for utilizing heat caused by flight speed to maintain the fuel in said fuel storage means at high pressure; a main engine mounted on said airframe; fuel conducting means on said airframe establishing communication between said fuel storage means and said main engine to supply the latter with fuel, said engine having a converging inlet and a diverging outlet, the inlet being shaped to increase the air and hydrogen fuel to a pressure and temperature sufficient to cause detonation thereof when the airframe is travelling at a velocity corresponding to a Mach number of substantially 6.5; a rocket booster separably mounted on said airframe, said rocket booster serving to put said airframe in motion and accelerate the same to said velocity; heat exchange means mounted on said airframe in regions exposed to high ram-air temperatures; and additional heat exchange means around parts of said main engine exposed to high temperatures, all said heat exchange means communicating with said fuel conducting means and having some of the hydrogen fuel circulated therethrough as it flows to said main engine.

7. In an aircraft, the combination comprising: an airframe; a detonation ramjet type main engine mounted on said airframe to effect propulsion thereof, said main engine requiring ram-air velocity Mach numbers of substantially 6.5; fuel storage means on said airframe for receiving and holding hydrogen fuel at high pressure, said fuel storage means being exposed to heat generated by flight speed to maintain the fuel at said high pressure; conduit means on said airframe establishing communication between said fuel storage means and said main engine, a part of said conduit means being disposed on said airframe to expose the same to ram air during flight of said aircraft to absorb heat and cool parts of said airframe; a booster engine of the rocket type separably attached to said airframe and operative to initiate motion thereof and accelerate the same to the speed required to effect the operation of said main engine; a landing engine of the jet type mounted on said airframe, said landing engine communicating with said fuel storage means and having a compressor driving turbine partially responsive to fuel pressure from said storage means; heat exchange means forming a part of the communication between said landing engine and said fuel storage means; and combustion means disposed to apply heat to said heat exchange means to increase the energy of fuel flowing therethrough, said combustion means receiving fuel following passage thereof through said turbine.

8. In an aircraft, the combination comprising: an airframe; a detonation ramjet type main engine mounted on said airframe to effect propulsion thereof, said main engine requiring ram-air velocity Mach numbers of substantially 6.5; fuel storage means on said airframe for receiving and holding hydrogen fuel at high pressure, said fuel storage means being exposed to heat generated by flight speed to maintain the fuel at said high pressure; conduit means on said airframe establishing communication between said fuel storage means and said main engine, a part of said conduit means being disposed on said airframe to expose the same to ram air during flight of said aircraft to absorb heat and cool parts of said airframe; a booster engine of the rocket type separably attached to said airframe and operative to initiate motion thereof and accelerate the same to the speed required to effect the operation of said main engine; a landing engine of the jet type mounted on said airframe, said landing engine communicating with said fuel storage means; a turbine in said landing engine; a compressor operatively connected with said turbine, the latter being driven by fuel from said fuel storage means prior to combustion of such fuel; heat exchange means forming a part of the communication between said landing engine and said fuel storage means, said heat exchanger being disposed at the outlet side of said compressor; and combustion means between said compressor and said heat exchange means to apply heat to the latter and increase the energy of fuel flowing to said turbine, said combustion means receiving fuel following passage thereof through said turbine.

References Cited in the file of this patent

UNITED STATES PATENTS

| | | |
|---|---|---|
| 2,544,830 | Grill | Mar. 13, 1951 |
| 2,644,396 | Billman | July 7, 1953 |
| 2,686,473 | Vogel | Aug. 17, 1954 |
| 2,943,828 | Van Driest | July 5, 1960 |
| 2,944,764 | Lane | July 12, 1960 |

FOREIGN PATENTS

| | | |
|---|---|---|
| 1,076,863 | France | Apr. 21, 1954 |

OTHER REFERENCES

"Rocket Power and Space Flight," 1957, by Harry Stine, Henry Holt & Co., N.Y., p. 131.

Aviation Week Magazine, June 22, 1959 (pages 156–165).